US012574979B2

(12) United States Patent
Liu et al.

(10) Patent No.: US 12,574,979 B2
(45) Date of Patent: Mar. 10, 2026

(54) METHOD FOR DETERMINING RELAY SCHEME, AND DEVICE

(71) Applicant: GUANGDONG OPPO MOBILE TELECOMMUNICATIONS CORP., LTD., Dongguan (CN)

(72) Inventors: Jianhua Liu, Dongguan (CN); Haorui Yang, Dongguan (CN); Yali Guo, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 424 days.

(21) Appl. No.: 18/085,567

(22) Filed: Dec. 20, 2022

(65) Prior Publication Data

US 2023/0209625 A1    Jun. 29, 2023

Related U.S. Application Data

(63) Continuation of application No. PCT/CN2020/119032, filed on Sep. 29, 2020.

(51) Int. Cl.
*H04W 76/14*        (2018.01)
*H04W 76/20*        (2018.01)
*H04W 92/18*        (2009.01)

(52) U.S. Cl.
CPC ........... *H04W 76/14* (2018.02); *H04W 76/20* (2018.02); *H04W 92/18* (2013.01)

(58) Field of Classification Search
CPC ..... H04W 76/14; H04W 76/20; H04W 76/23; H04W 84/047; H04W 84/18; H04W 88/04; H04W 92/18
See application file for complete search history.

(56) References Cited

U.S. PATENT DOCUMENTS

| | | | | |
|---|---|---|---|---|
| 11,812,481 | B2 * | 11/2023 | Paladugu | .............. H04W 40/22 |
| 2017/0332425 | A1 * | 11/2017 | Tenny | .................... H04W 76/14 |
| 2021/0219385 | A1 * | 7/2021 | Paladugu | .............. H04W 8/005 |
| 2023/0379765 | A1 * | 11/2023 | Deng | ................ H04W 28/0268 |

FOREIGN PATENT DOCUMENTS

| | | |
|---|---|---|
| CN | 101997593 A | 3/2011 |
| CN | 108809897 A | 11/2018 |
| CN | 110098858 A | 8/2019 |
| KR | 20150115436 A | 10/2015 |
| WO | 2018013786 A2 | 1/2018 |

OTHER PUBLICATIONS

Extended European Search Report issued in corresponding European application No. 20955593.7, mailed Oct. 24, 2023.

(Continued)

*Primary Examiner* — Thomas R Cairns
(74) *Attorney, Agent, or Firm* — BAYES PLLC

(57)        ABSTRACT

Embodiments of the present disclosure relate to a method for determining a relay scheme, and a device. The method comprises: a relay device determining a relay scheme to be used in a process of establishing a connection. Embodiments of the present disclosure enables determination of a relay scheme to be used between a relay device and a remote device.

10 Claims, 5 Drawing Sheets

(56)           References Cited

OTHER PUBLICATIONS

Source: Futurewei; Title: Protocol Stack and Connection Setup Procedure of Sidelink Relay 3GPP TSG-RAN WG2 Meeting #111e R2-2006722 Electronic Meeting, Aug. 17-28, 2020.

3GPP TR 23.752 V0.5.0 (Sep. 2020); Technical Specification Group Services and System Aspects;Study on system enhancement for Proximity based Services(ProSe) in the 5G System (5GS) (Release 17).

International Search Report issued in International application No. PCT/CN2020/119032, mailed Jun. 29, 2021, 4 pages.

Written Opinion of the International Searching Authority issued in International application No. PCT/CN2020/119032, mailed Jun. 29, 2021, 7 pages.

3GPP TS 23.502 V16.0.0 (Mar. 2019), "3rd Generation Partnership Project; Technical Specification Group Services and System Aspects; Procedures for the 5G System; Stage 2 (Release 16)".

3GPP TS 38.300 V16.0.0 (Dec. 2019), 3rd Generation Partnership Project; Technical Specification Group Radio Access Network; NR; NR and NG-RAN Overall Description; Stage 2 (Release 16).

TSG-RAN WG1 #56-bis R1-091439, Souel, Korea, Mar. 23-Mar. 27, 2009, "Approach for Selecting Relay Operation Mode Based on User Traffic Types", Agenda Item: 15.3, Source: ZTE.

* cited by examiner

100
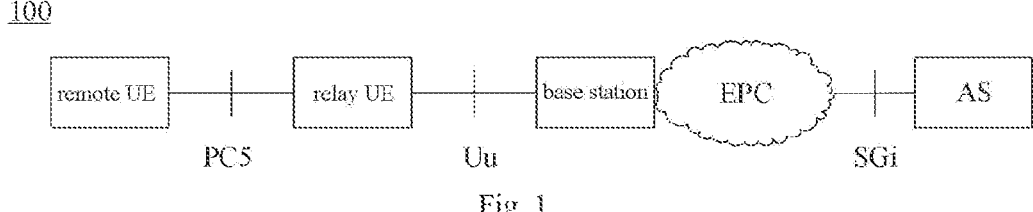
Fig. 1
200
determining, by a relay device in a connection establishment process, a relay mode to be used    S210
Fig. 2
300
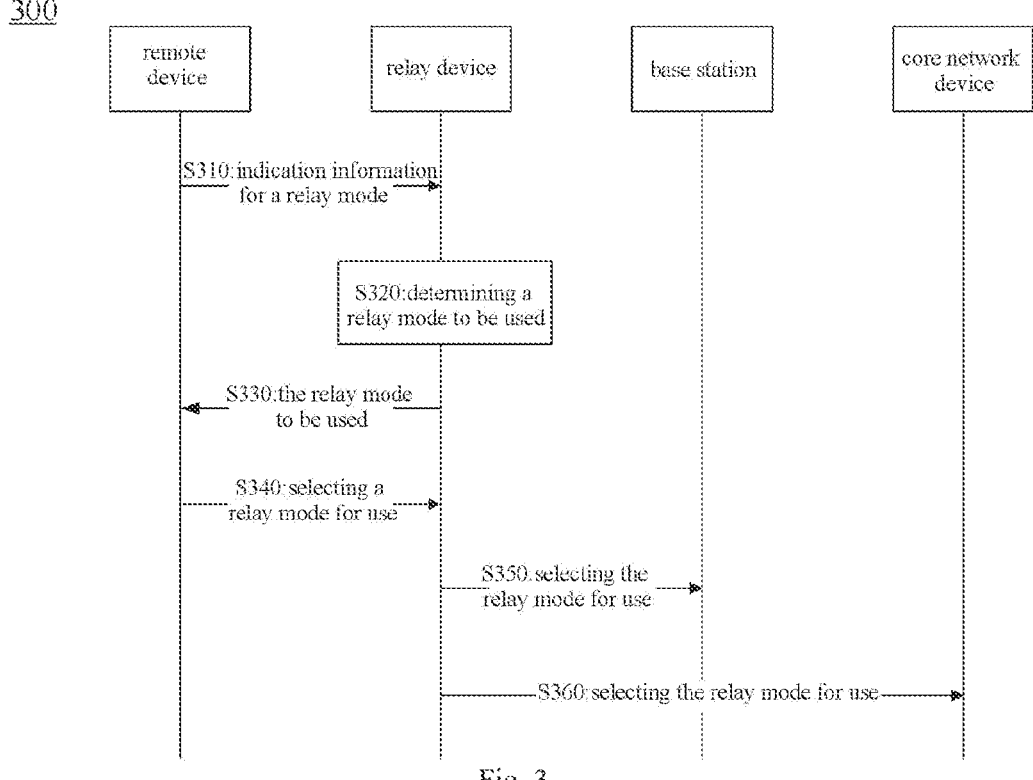
Fig. 3

<u>700</u> relay device 800 first determination
module                  810 relay device 900 first determination          810          first sending module          930
module feedback module             920 first receiving module        940          second sending module        950

METHOD FOR DETERMINING RELAY SCHEME, AND DEVICE

CROSS-REFERENCE TO RELATED APPLICATION

The present application is a continuation of International Application No. PCT/CN2020/119032 filed on Sep. 29, 2020, the entire disclosure of which is incorporated herein by reference.

TECHNICAL FIELD

The present disclosure relates to the field of communication, and more particularly, to a method for determining a relay mode and a device.

BACKGROUND

The 3rd Generation Partnership Project (3GPP) specification stipulates technologies for User Equipment (UEs) to access a network via a relay device. A Device-to-Device (D2D) communication technologies are used for communication between a remote UE and a relay UE, and the interface is a PC5 interface. Before the communication, the remote UE needs to discover and select the relay UE. There are various relay modes between the remote UE and the relay UE, such as a mode based on layer-3 relay, a mode based on layer-2 relay, and a mode based on Non-3GPP Interworking Function (N3IWF) relay. In the related art, a relay mode to be used between the remote UE and the relay UE cannot be determined.

SUMMARY

Embodiments of the present disclosure provides a method for determining a relay mode, a terminal device, and a network device, which can determine a relay mode to be used between a relay device and a remote device.

Embodiments of the present disclosure propose a method for determining a relay mode, including: determining, by a relay device in a connection establishment process, a relay mode to be used.

Embodiments of the present disclosure further propose a method for receiving a relay mode, including: receiving, by a remote device in a connection establishment process, a relay mode to be used.

Embodiments of the present disclosure further propose a relay mode-based processing method, including: receiving, by a network device, a relay mode from a relay device; and performing, by the network device, a corresponding processing for the relay mode.

Embodiments of the present disclosure further propose a relay device, including: a first determination module, configured to determine, in a connection establishment process, a relay mode to be used.

Embodiments of the present disclosure further propose a remote device, including: a second receiving module, configured to receive, in a connection establishment process, a relay mode to be used.

Embodiments of the present disclosure further propose a network device, including: a third receiving module, configured to receive a relay mode from a relay device; and a processing module, configured to perform a corresponding processing for the relay mode.

Embodiments of the present disclosure further propose a terminal device, including a processor and a memory. The memory is configured to store a computer program, and the processor is configured to call and run the computer program stored in the memory to perform the method as described above.

Embodiments of the present disclosure further propose a network device, including a processor and a memory. The memory is configured to store a computer program, and the processor is configured to call and run the computer program stored in the memory to perform the method as described above.

Embodiments of the present disclosure further propose a chip, including: a processor, configured to call and run a computer program from a memory, so that a device installed with the chip performs the method as described above.

Embodiments of the present disclosure further propose a computer-readable storage medium, configured to store a computer program that causes a computer to perform the method as described above.

Embodiments of the present disclosure further propose a computer program product, including computer program instructions, which cause a computer to perform the method as described above.

Embodiments of the present disclosure further propose a computer program which causes a computer to perform the method as described above.

According to embodiments of the present disclosure, in the connection establishment process, the relay device determines the relay mode to be used, so as to realize the determination of the relay mode between the relay device and the remote device.

BRIEF DESCRIPTION OF THE DRAWINGS

FIG. 1 is a schematic diagram of an application scenario according to an embodiment of the present disclosure.

FIG. 2 is a schematic flowchart of a method 200 for determining a relay mode according to an embodiment of the present disclosure.

FIG. 3 is a schematic flowchart of a first implementation 300 about a method for determining a relay mode according to an embodiment of the present disclosure.

DETAILED DESCRIPTION

Figures 4, 5, 6:
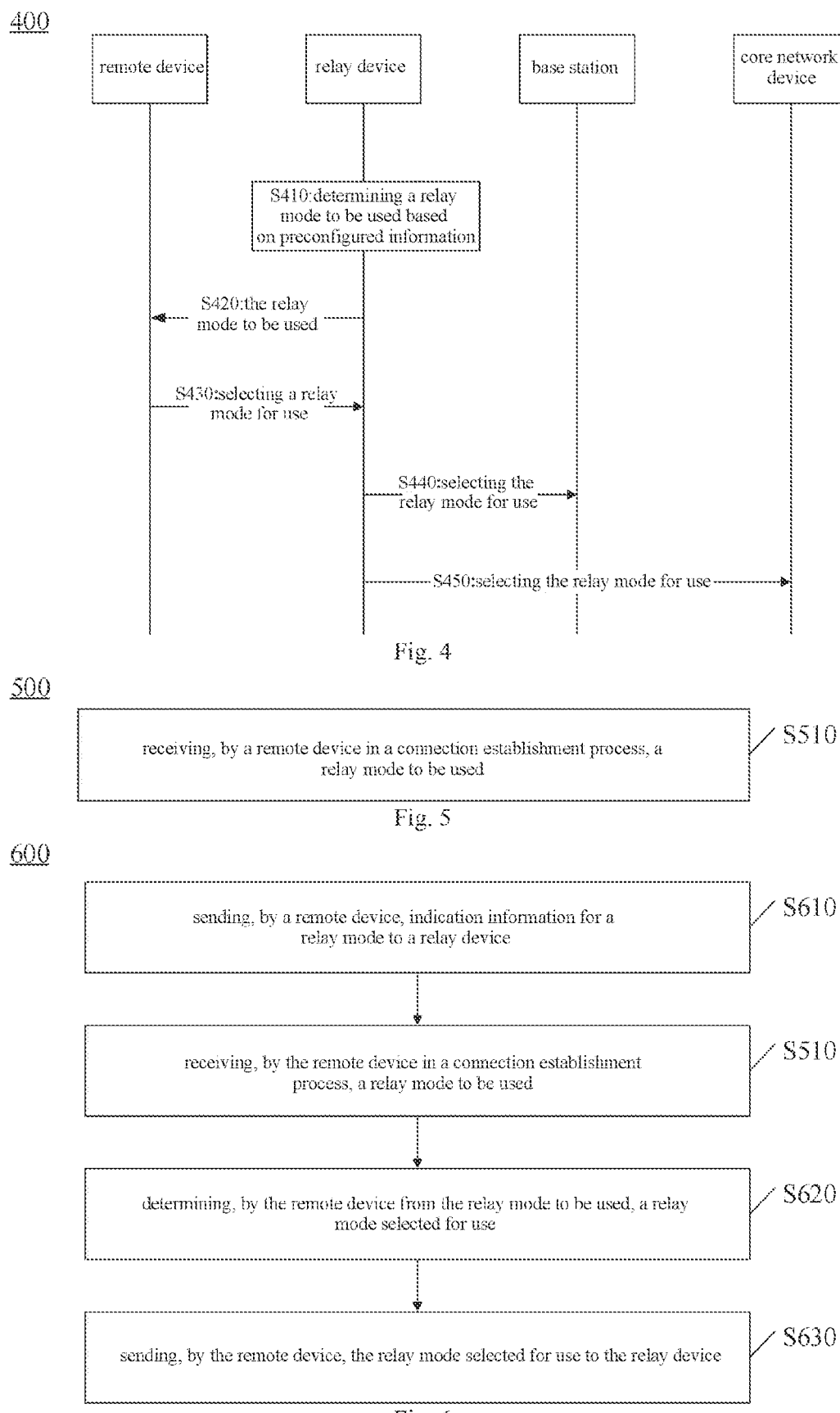
FIG. 4 is a schematic flowchart of a second implementation 400 about a method for determining a relay mode according to an embodiment of the present disclosure.
FIG. 5 is a schematic flowchart of a method 500 for receiving a relay mode according to an embodiment of the present disclosure.
FIG. 6 is a schematic flowchart of a method 600 for receiving a relay mode according to an embodiment of the present disclosure.

The technical solutions in embodiments of the present disclosure will be described below in combination with the drawings in embodiments of the present disclosure.

It be noted that terms "first", "second", etc. in the specification, claims and the above drawings of embodiments of the present disclosure are used to distinguish similar objects and are not necessarily used to describe a particular order or sequence. In addition, objects described by means of "first", "second" may be or may be not the same.

The technical solutions in embodiments of the present disclosure are applicable to various communication systems, for example, a global system of mobile communication (GSM) system, a code division multiple access (CDMA) system, a wideband code division multiple access (WCDMA) system, a general packet radio service (GPRS) system, a long term evolution (LTE) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a universal mobile telecommunication system (UMTS), a wireless local area network (WLAN), a wireless fidelity (WiFi), a 5th-Generation (5G) communication system, or other communication systems.

Generally speaking, a conventional communication system generally supports a limited number of connections and therefore is easy to implement. However, with development of communication technology, a mobile communication system will not only support conventional communication, but also support, for example, device to device (D2D) communication, machine to machine (M2M) communication, machine type communication (MTC), vehicle to vehicle (V2V) communication, etc. Embodiments of the present disclosure may also be applied to these communication systems.

Optionally, a communication system in embodiments of the present disclosure may be applied to a carrier aggregation (CA) scenario, a dual connectivity (DC) scenario, or a standalone (SA) network deployment scenario.

Spectrums to which embodiments of the present disclosure are applied are not limited. For example, embodiments of the present disclosure may be applied to licensed spectrums as well as unlicensed spectrums.

Embodiments of the present disclosure describe various embodiments in conjunction with a network device and a terminal device. The terminal device may also be referred to as User Equipment (UE), an access terminal, a subscriber unit, a subscriber station, a mobile station, a rover station, a remote station, a remote terminal, a mobile device, a user terminal, a terminal, a wireless communication device, a user agent, or a user device, etc. The terminal device may be a station (ST) in WLAN. Alternatively, the terminal device may be a cellular phone, a cordless phone, a Session Initiation Protocol (SIP) phone, a Wireless Local Loop (WLL) station, a Personal Digital Assistant (PDA) device, a handheld device or a computing device with a wireless communication function, or other processing devices connected to a wireless modem, a vehicle-mounted device, a wearable device, or a terminal device in a next generation communication system, such as a terminal device in an NR network or a terminal device in a future evolved Public Land Mobile Network (PLMN).

By way of example but not limitation, in embodiments of the present disclosure, the terminal device may be a wearable device. The wearable device may also be called a wearable intelligent device, which is a general term of wearable devices designed intelligently and developed on daily wear using wearable technology, such as glasses, gloves, a watch, clothing, and shoes. The wearable device is a portable device that is worn directly on a body or integrated into a user's clothes or accessories. The wearable device is not only a hardware device, but also implements powerful functions through software support, data interaction, and cloud interaction. Generalized wearable intelligent devices include: a device with full features, a large size, and full or partial functions which may be implemented without relying on a smart phone, for example, a smart watch or smart glasses; as well as a device that is only focused on a certain application function and needs to be cooperated with other devices such as a smart phone, for example, a smart bracelet and a smart jewelry for various physical sign monitoring.

The network device may be a device for communicating with a mobile device, or may be an Access Point (AP) in WLAN, or a Base Transceiver Station (BTS) in GSM or CDMA, or may be a NodeB (NB) in WCDMA, or an Evolutional Node B (eNB or eNodeB) in Long Term Evolution (LTE), or a relay station or an access point, or a vehicle-mounted device, a wearable device, a network device (gNB) in the NR network, or a network device in the future evolved PLMN network.

In embodiments of the present disclosure, the network device provides services for a cell, and a terminal device communicates with the network device through transmission resources (for example, frequency domain resources, or spectrum resources) used by the cell. The cell may be a cell corresponding to the network device (e.g., a base station), and the cell may belong to a macro base station, or belong to a base station corresponding to a small cell. Here, the small cell may include a metro cell, a micro cell, a pico cell, a femto cell, etc. These small cells have characteristics such as small coverage and low transmit power, and are suitable for providing high-speed data transmission services.

It should be understood that the terms "system" and "network" herein may often be interchanged herein. The term "and/or" herein only indicates an association relationship that describes associated objects, and represents that there may be three relationships. For example, A and/or B may represent cases where A exists alone, A and B exist simultaneously, and B exists alone. In addition, the character "I" herein generally indicates that proceeding and following objects associated thereby are in an "or" relationship.

It should be understood that the "indication" mentioned in embodiments of the present disclosure may be direct indication or indirect indication, and may also represent there is an association relationship. For example, if A indicates B, it may mean that A directly indicates B. For example, B can be obtained through A. Also, it may mean that A indirectly indicates B. For example, A indicates C, and B can be obtained through C. Besides, it may also mean that there is an association relationship between A and B.

In the description of embodiments of the present disclosure, the term "corresponding" may mean that there is a direct or indirect correspondence between two items, or may mean that there is an association relationship between two items, or may also mean that there is an indicating-and-indicated relationship or a configuring-and-configured relationship between two items.

In order to facilitate understanding of the technical solutions in embodiments of the present disclosure, the related arts of embodiments of the present disclosure are described below. The following related arts, acting as optional solutions, may be arbitrarily combined with the technical solutions in embodiments of the present disclosure, which all belong to the protection scope of embodiments of the present disclosure.

With the continuous development of the 5th Generation Mobile Networks or 5th Generation Wireless Systems or 5th-Generation (5G) application, the Network Controlled Interactive Services (NCIS) service is introduced into the standards as a new service form for related standardized services. The NCIS service is mainly used for applications such as Augmented Reality (AR) or Virtual Reality (VR) and games, and has high requirements for service quality such as rate, delay, packet loss rate, and high-speed codec. A session established for the NCIS service is an NCIS session, and UEs in the same NCIS session may be considered to form an NCIS group, for example, a team in a game.

UEs in the NCIS group have the following possible communication modes, which may also be used in combination.

(1) Being in proximity with each other, where, for example, broadcast or multicast is performed using D2D technologies, or a sidelink (also known as the use of a PC5 interface) is established for one-to-one communication (unicast).

(2) Being away from each other, where, for example, the UE-network-server-peer network-peer UE is used (also known as the use of a Uu interface).

UEs in the group may come from the same Public Land Mobile Network (PLMN), or may come from different PLMNs. For example, there are five UEs in an NCIS group, among which three UEs belong to PLMN 1, and two UEs belong to PLMN 2. The three UEs in PLMN 1 may directly communicate with each other over the PC5 interface through the D2D technologies, and may also communicate with the two UEs in PLMN 2 using a network.

An implementation about the NCIS service is that UE uses a relay to transmit data. There is a UE-to-network relay in the 3GPP published specifications, and an architecture thereof is shown in FIG. 1. FIG. 1 is a schematic diagram of an application scenario according to an embodiment of the present disclosure. As shown in FIG. 1, the remote UE and the relay UE communicate with each other using the D2D technologies, and the interface is the PC5 interface. The relay UE is connected to a base station (eNB) by means of the Uu interface, and then communicates with a Public Safety Access Stratum (AS) through an Evolved Packet Core (EPC) network and a SGi interface.

Before the communication, the remote UE needs to discover and select the relay UE. There are various relay modes in the related art, such as a mode based on layer-3 relay, a mode based on layer-2 relay, and a mode based on N3IWF relay. In view of the existence of a plurality of relay modes, in the establishment process of a relay connection, the remote UE (or called a remote device) needs to negotiate a relay mode used with the relay UE (or called a relay device). Embodiments of the present disclosure propose a solution in this respect.

Embodiments of the present disclosure propose a method for determining a relay mode. FIG. 2 is a schematic flowchart of a method 200 for determining a relay mode according to an embodiment of the present disclosure. The method may optionally be applied to the system shown in FIG. 1. For example, the method may be applied to the relay UE shown in FIG. 1, but not limited thereto. The method includes at least some of the following contents.

In S210, a relay device determines a relay mode to be used in a connection establishment process.

The relay mode may include at least one of a layer-3 relay mode, a layer-2 relay mode, and a N3IWF relay mode.

In embodiments of the present disclosure, based on relay modes supported by the remote device, the relay device may select one or more relay modes from the relay modes supported by the remote device as relay modes to be used. Alternatively, the relay device may determine the relay modes to be used based on preconfigured information.

Afterwards, the relay device may send the relay modes to be used as determined to the remote device, and the remote device selects a specific relay mode for use from the relay modes to be used.

For the above-mentioned first implementation, reference is made to FIG. 3. which is a schematic flowchart of a first implementation 300 about a method for determining a relay mode according to an embodiment of the present disclosure. As shown in FIG. 3, optionally, the determining, by the relay device, the relay mode to be used in the connection establishment process as described above includes S310 to S320.

In S310, the relay device receives indication information for a relay mode from the remote device.

In S320, the relay device determines the relay mode to be used according to the indication information for the relay mode.

Optionally, in the step S310, the relay device may receive the indication information for the relay mode from the remote device through a PC5-S interface or a Radio Resource Control (RRC) message.

Optionally, in the step S310, the relay device may receive the indication information for the relay mode from the remote device when the remote device initiates establishment of a relay connection.

Optionally, the indication information for the relay mode includes at least one relay mode supported by the remote device.

Optionally, in the step S320, the relay device may determine the relay mode to be used by the way of: the relay device selecting the relay mode to be used from the at least one relay mode supported by the remote device based on capability and/or authorization information of the relay device.

Optionally, if the at least one relay mode supported by the remote device cannot be supported by the relay device, the relay device sends failure information to the remote device.

As shown in FIG. 3, the foregoing implementation may further include: in S330, the relay device sends the relay mode to be used to the remote device.

Optionally, the relay device may send the relay mode to be used to the remote device through the PC5-S interface or the RRC message.

As shown in FIG. 3, the foregoing implementation may further include: in S340, the relay device receives a relay mode selected for use by the remote device.

For example, the remote device supports relay modes 1, 2, and 3. In the step S310, the relay device receives the indication information for the relay mode from the remote device, and the indication information for the relay mode includes the relay modes 1, 2, and 3 supported by the remote device. In the step S320, the relay device determines, from the relay modes 1, 2, and 3, that the relay modes to be used are relay modes 1 and 2, based on its own capability and/or authorization information. If the relay device finds that none of the relay modes 1, 2, and 3 can be supported based on its own capability and/or authorization information, it feeds back the failure information to the remote device. In the step S330, the relay device sends the relay modes to be used, that is, the relay modes 1 and 2, to the remote device. The remote device selects the relay mode 1 from the relay modes to be used as the relay mode selected for use, and sends the relay mode selected for use to the relay device. In the step S340, the relay device receives the relay mode selected for use by the remote device, that is, the relay mode 1.

Optionally, after receiving the relay mode selected for use by the remote device, the relay device may further send the relay mode selected for use by the remote device. Specifically, the relay device may send the relay mode selected for use by the remote device to a base station or a core network element.

As shown in FIG. 3, optionally, the sending the relay mode selected for use by the remote device as described above includes: in S350, the relay device sends the relay mode selected for use by the remote device to the base station through the RRC message.

A corresponding processing may be performed by the base station on the relay mode selected for use by the remote device. For example, if the relay mode selected for use by the remote device is the layer-3 relay mode, the base station will perform no processing. Alternatively, if the relay mode selected for use by the remote device is the layer-2 relay mode, the base station performs a layer-2 relay related configuration.

As shown in FIG. 3, optionally, the sending the relay mode selected for use by the remote device as described above includes: in S360, the relay device sends the relay mode selected for use by the remote device to a core network device through a Non-Access Stratum (NAS) message.

Specifically, the core network device may include an Access and Mobility Management Function (AMF).

A corresponding processing may be performed by the core network device on the relay mode selected for use by the remote device. For example, if the relay mode selected for use by the remote device is the layer-2 relay mode, the network device will not actively release a terminal device.

The second implementation in which the remote device determines the relay mode to be used (that is, determining the relay mode to be used based on the preconfigured information) mentioned above is shown in FIG. 4. FIG. 4 is a schematic flowchart of a second implementation 400 about a method for determining a relay mode according to an embodiment of the present disclosure. As shown in FIG. 4, optionally, the determining, by the relay device, the relay mode to be used in the connection establishment process as described above includes: in S410, the relay device determines the relay mode to be used based on the preconfigured information.

Optionally, the preconfigured information indicates at least one of the following: configuring the relay mode to be used for a specific service; configuring the relay mode to be used for a relay service code; configuring the relay mode to be used for Data Network Name (DNN) information; configuring the relay mode to be used for network slice information; configuring the relay mode to be used based on a PLMN; and configuring the relay mode to be used based on a Radio Access Technology (RAT).

As shown in FIG. 4, the foregoing implementation may further include: in S420, the relay device sends the relay mode to be used to the remote device.

Optionally, the relay device may send the relay mode to be used to the remote device through the PC5-S interface or the RRC message.

As shown in FIG. 4, the foregoing implementation may further include: in S430, the relay device receives the relay mode selected for use by the remote device.

For example, in the step S410, the relay device determines that the relay modes to be used are relay modes 1 and 2 based on its own capability and/or authorization information. In the step S420, the relay device sends the relay modes to be used, that is, the relay modes 1 and 2, to the remote device. The remote device selects the relay mode 1 from the relay modes to be used as the relay mode selected for use, and sends the relay mode selected for use to the relay device. In the step S430, the relay device receives the relay mode selected for use by the remote device, that is, the relay mode 1.

Optionally, after receiving the relay mode selected for use by the remote device, the relay device may further send the relay mode selected for use by the remote device. Specifically, as shown in steps S440 and S450 in FIG. 4, the relay device may send the relay mode selected for use by the remote device to the base station or the core network element. A specific sending way and a processing way of base station or core network element are the same as the example shown in FIG. 3, and will not be repeated here.

Embodiments of the present disclosure further propose a method for receiving a relay mode. FIG. 5 is a schematic flowchart of a method 500 for receiving a relay mode according to an embodiment of the present disclosure. The method may optionally be applied to the system shown in FIG. 1. For example, the method may be applied to the remote UE shown in FIG. 1, but is not limited thereto. The method includes at least some of the following contents.

In S510, a remote device receives a relay mode to be used in a connection establishment process.

Optionally, the remote device receives the relay mode to be used from a relay device.

FIG. 6 is a schematic flowchart of a method 600 for receiving a relay mode according to an embodiment of the present disclosure. As shown in FIG. 6, optionally, before the relay mode to be used is received, the method further includes: in S610, the remote device sends indication information for a relay mode to the relay device.

Optionally, the sending, by the remote device, the indication information for the relay mode to the relay device as described above includes: the remote device sending the indication information for the relay mode to the relay device through a PC5-S interface or a RRC message.

Optionally, the sending, by the remote device, the indication information for the relay mode to the relay device as described above includes: when the remote device initiates establishment of a relay connection, the remote device sending the indication information for the relay mode to the relay device.

Optionally, the indication information for the relay mode includes at least one relay mode supported by the remote device.

Optionally, the above method further includes: in S620, the remote device determines a relay mode selected for use from the relay mode to be used; and in S630, the remote device sends the relay mode selected for use to the relay device.

Optionally, the relay mode includes at least one of a layer-3 relay mode, a layer-2 relay mode, and a N3IWF relay mode.

Figure 7:
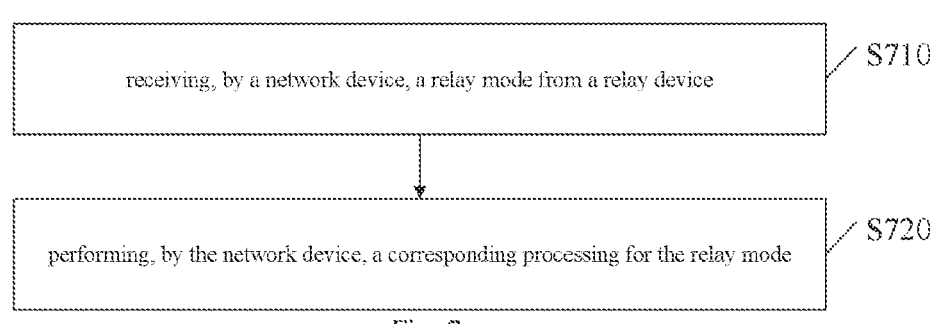
FIG. 7 is a schematic flowchart of a relay mode-based processing method 700 according to an embodiment of the present disclosure.

Embodiments of the present disclosure propose a relay mode-based processing method. FIG. 7 is a schematic flowchart of a relay mode-based processing method 700 according to an embodiment of the present disclosure. The method may optionally be applied to the system shown in FIG. 1. For example, the method may be applied to the network device shown in FIG. 1, but is not limited thereto. The method includes at least some of the following contents.

In S710, a network device receives a relay mode from a relay device.

In S720, the network device performs a corresponding processing for the relay mode.

Optionally, the relay mode includes at least one of a layer-3 relay mode, a layer-2 relay mode, and a N3IWF relay mode.

Optionally, the receiving, by the network device, the relay mode from the relay device as described above includes: the network device receiving the relay mode from the relay device through a RRC message.

Optionally, the performing, by the network device, the corresponding processing for the relay mode as described above includes: if the relay mode is the layer-3 relay mode, the network device performs no processing; and if the relay mode is the layer-2 relay mode, the network device performs a layer-2 relay related configuration.

Optionally, the network device includes a base station.

Optionally, the receiving, by the network device, the relay mode from the relay device as described above includes: the network device receiving the relay mode from the relay device through a NAS message.

Optionally, the performing, by the network device, the corresponding processing for the relay mode as described above includes: if the relay mode is the layer-2 relay mode, the network device does not actively release the terminal device.

Optionally, the network device includes a core network device.

Optionally, the core network device includes an AMF.

Figure 8:
FIG. 8 is a schematic structural diagram of a relay device 800 according to an embodiment of the present disclosure.

Embodiments of the present disclosure further propose a relay device. FIG. 8 is a schematic structural diagram of a relay device 800 according to an embodiment of the present disclosure. The relay device 800 includes: a first determination module 810, configured to determine a relay mode to be used in a connection establishment process.

The relay device in an embodiment may refer to a UE that provides a relay service for a remote UE, or a UE in a relay state.

Optionally, the first determination module 810 is configured to: receive indication information for a relay mode from a remote device; and determine the relay mode to be used according to the indication information for the relay mode.

Optionally, the first determination module 810 receives the indication information for the relay mode from the remote device through a PC5-S interface or a RRC message.

Optionally, the first determination module 810 receives the indication information for the relay mode from the remote device when the remote device initiates establishment of a relay connection.

Optionally, the indication information for the relay mode includes at least one relay mode supported by the remote device.

Optionally, the first determination module 810 is configured to select the relay mode to be used from the at least one relay mode supported by the remote device based on capability and/or authorization information of the relay device.

Figure 9:
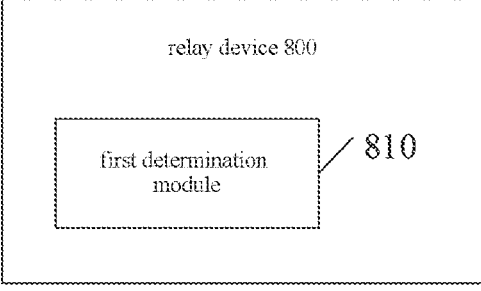
FIG. 9 is a schematic structural diagram of a relay device 900 according to an embodiment of the present disclosure.

FIG. 9 is schematic structural diagram of a relay device 900 according to an embodiment of the present disclosure. As shown in FIG. 9, optionally, the relay device further includes: a feedback module 920, configured to send failure information to the remote device, if the at least one relay mode supported by the remote device is not supported by the relay device.

Optionally, the first determination module 810 is configured to determine the relay mode to be used based on preconfigured information. The preconfigured information indicates at least one of the following: configuring the relay mode to be used for a specific service; configuring the relay mode to be used for a relay service code; configuring the relay mode to be used for Data Network Name (DNN) information; configuring the relay mode to be used for network slice information; configuring the relay mode to be used based on a Public Land Mobile Network (PLMN); and configuring the relay mode to be used based on a Radio Access Technology (RAT).

As shown in FIG. 9, optionally, the relay device further includes: a first sending module 930, configured to send the relay mode to be used to the remote device.

Optionally, the first sending module 930 sends the relay mode to be used to the remote device through the PC5-S interface or the RRC message.

As shown in FIG. 9, optionally, the above relay device further includes: a first receiving module 940, configured to receive the relay mode selected for use by the remote device.

As shown in FIG. 9, optionally, the relay device further includes: a second sending module 950, configured to send the relay mode selected for use by the remote device.

Optionally, the second sending module 950 sends the relay mode selected for use by the remote device to a base station through the RRC message.

Optionally, the second sending module 950 sends the relay mode selected for use by the remote device to a core network device through a Non-Access Stratum (NAS) message.

Optionally, the core network device includes an AMF.

Optionally, the relay mode includes at least one of a layer-3 relay mode, a layer-2 relay mode, and a N3IWF relay mode.

It should be understood that the above-mentioned and other operations and/or functions of modules in the relay device according to embodiments of the present disclosure are respectively used to realize respective processes of the relay device in the method 200 in FIG. 2, which are not repeated here for brevity.

Figure 10:
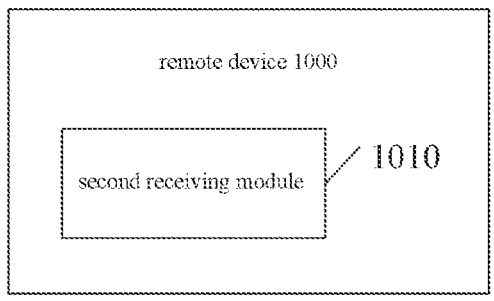
FIG. 10 is a schematic structural diagram of a relay device 1000 according to an embodiment of the present disclosure.

Embodiments of the present disclosure further propose a remote device. FIG. 10 is a schematic structural diagram of a remote device 1000 according to an embodiment of the present disclosure. The remote device 1000 includes: a second receiving module 1010, configured to receive a relay mode to be used in a connection establishment process.

The remote device in an embodiment may refer to a UE that interacts with a network through a relay UE.

Optionally, the second receiving module 1010 receives the relay mode to be used from a relay device.

Figure 11:
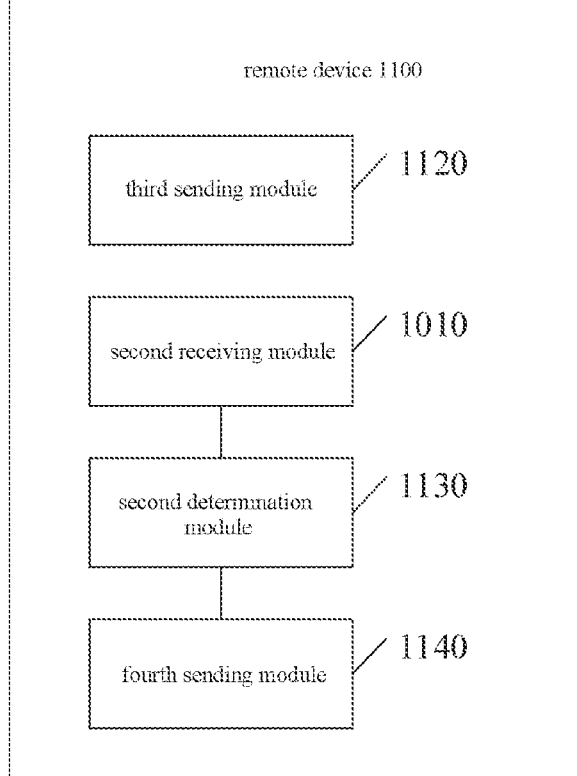
FIG. 11 is a schematic structural diagram of a remote device 1100 according to an embodiment of the present disclosure.

FIG. 11 is a schematic structural diagram of a remote device 1100 according to an embodiment of the present disclosure. As shown in FIG. 11, optionally, the remote device further includes: a third sending module 1120, configured to send indication information for a relay mode to the relay device.

Optionally, the third sending module 1120 sends the indication information for the relay mode to the relay device through a PC5-S interface or a RRC message.

Optionally, the third sending module 1120 sends the indication information for the relay mode to the relay device when initiating establishment of a relay connection.

Optionally, the indication information for the relay mode includes at least one relay mode supported by the remote device.

As shown in FIG. 11, optionally, the remote device further includes: a second determination module 1130, configured to determine a relay mode selected for use from the relay mode to be used; and a fourth sending module 1140, configured to send the relay mode selected for use to the relay device.

Optionally, the relay mode includes at least one of a layer-3 relay mode, a layer-2 relay mode, and a N3IWF relay mode.

It should be understood that the above-mentioned and other operations and/or functions of modules in the remote device according to embodiments of the present disclosure are respectively used to realize respective processes of the remote device in the method 500 in FIG. 5, which are not repeated here for brevity.

Figure 12:
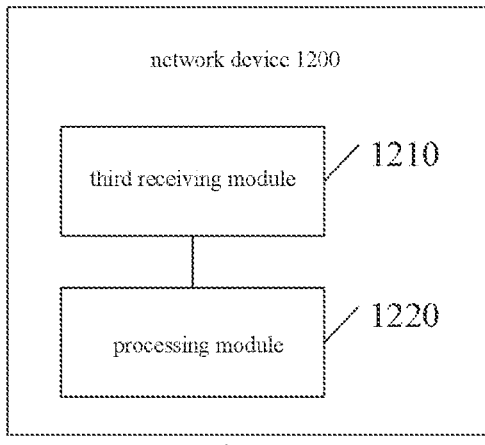
FIG. 12 is a schematic structural diagram of a network device 1200 according to an embodiment of the present disclosure.

Embodiments of the present disclosure further propose a network device. FIG. 12 is a schematic structural diagram of a network device 1200 according to an embodiment of the present disclosure. The network device 1200 includes: a third receiving module 1210, configured to receive a relay mode from a relay device; and a processing module 1220, configured to perform a corresponding processing for the relay mode.

Optionally, the relay mode includes at least one of a layer-3 relay mode, a layer-2 relay mode, and a N3IWF relay mode.

Optionally, the third receiving module 1210 receives the relay mode from the relay device through a RRC message.

Optionally, the processing module 1220 is configured to perform no processing if the relay mode is the layer-3 relay mode.

Optionally, the processing module 1220 is configured to perform a layer-2 relay related configuration if the relay mode is the layer-2 relay mode.

Optionally, the network device includes a base station.

Optionally, the third receiving module 1210 receives the relay mode from the relay device through a NAS message.

Optionally, the processing module 1220 is configured to not actively release a terminal device if the relay mode is the layer-2 relay mode.

Optionally, the network device includes a core network device.

Optionally, the core network device includes an Access and Mobility Management Function (AMF).

It should be understood that the above-mentioned and other operations and/or functions of modules in the network device according to embodiments of the present disclosure are respectively used to realize respective processes of the network device in the method 700 in FIG. 7, which are not repeated here for brevity.

Figure 13:
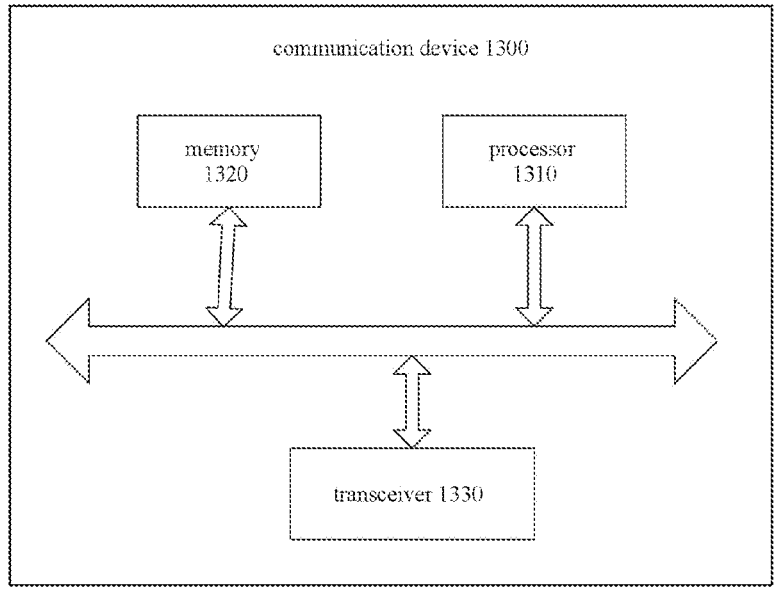
FIG. 13 is a schematic structural diagram of a communication device 1300 according to an embodiment of the present disclosure.

FIG. 13 is a schematic structural diagram of a communication device 1300 according to an embodiment of the present disclosure. The communication device 1300 shown in FIG. 13 includes a processor 1310. The processor 1310 may call a computer program from a memory and run the computer program, to implement the method in embodiments of the present disclosure.

Optionally, as shown in FIG. 13, the communication device 1300 may further include a memory 1320. The processor 1310 may call the computer program from the memory 1320 and run the computer program, to implement the method in embodiments of the present disclosure.

The memory 1320 may be a separate component independent of the processor 1310, or may be integrated into the processor 1310.

Optionally, as shown in FIG. 13, the communication device 1300 may further include a transceiver 1330. The processor 1310 may control the transceiver 1330 to communicate with another device. Specifically, the transceiver 1330 may transmit information or data to another device, or receive information or data transmitted by another device.

The transceiver 1330 may include a transmitter and a receiver. The transceiver 1330 may further include an antenna. There may be one or more antennas.

Optionally, the communication device 1300 may be the terminal device (including the relay device and the remote device) in embodiments of the present disclosure, and the communication device 1300 may implement respective procedures performed by the terminal device in various methods according to embodiments of the present disclosure. For brevity, details are not described herein again.

Optionally, the communication device 1300 may be the network device in embodiments of the present disclosure, and the communication device 1300 may implement respective procedures performed by the network device in various methods according to embodiments of the present disclosure. For brevity, details are not described herein again.

Figure 14:
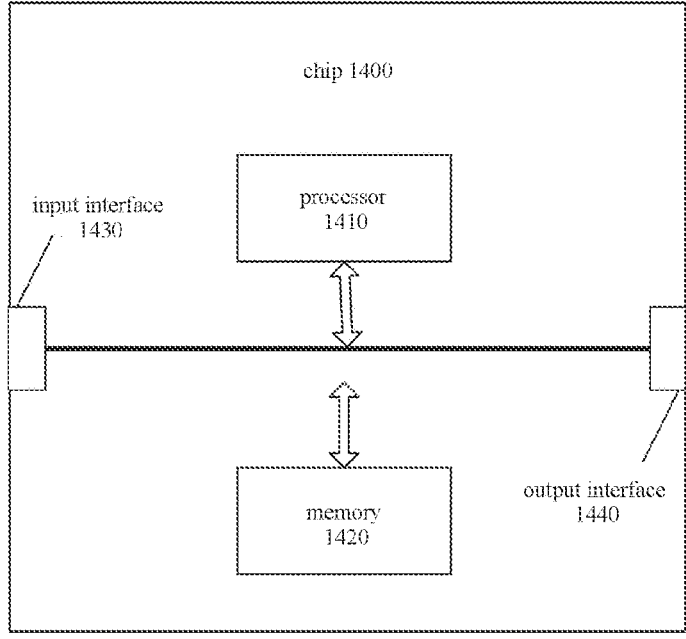
FIG. 14 is a schematic structural diagram of a chip 1400 according to an embodiment of the present disclosure.

FIG. 14 is a schematic structural diagram of a chip 1400 according to an embodiment of the present disclosure. The chip 1400 shown in FIG. 14 includes a processor 1410 which can call and run a computer program from a memory to implement the method according to embodiments of the present disclosure.

Optionally, as shown in FIG. 14, the chip 1400 may further include a memory 1420. The processor 1410 can call and run the computer program from the memory 1420 to carry out the method in embodiments of the present disclosure.

The memory 1420 may be a separate device independent of the processor 1410, or may be integrated in the processor 1410.

Optionally, the chip 1400 may further include an input interface 1430. The processor 1410 may control the input interface 1430 to communicate with other devices or chips, and specifically, to acquire information or data transmitted by other devices or chips.

Optionally, the chip 1400 may further include an output interface 1440. The processor 1410 may control the output interface 1440 to communicate with other devices or chips, and specifically, to output information or data to other devices or chips.

Optionally, the chip may be applied to the terminal device (including the relay device and the remote device) in embodiments of the present disclosure, and the chip may implement respective procedures performed by the terminal device in various methods according to embodiments of the present disclosure. For brevity, details are not described herein again.

Optionally, the chip may be applied to the network device in embodiments of the present disclosure, and the chip may implement respective procedures performed by the network device in various methods according to embodiments of the present disclosure. For brevity, details are not described herein again.

It should be understood that the chip mentioned in embodiments of the present disclosure may also be referred as to a system-level chip, a system chip, a chip system, or a system-on-chip.

The foregoing processor may be a general-purpose processor, a Digital Signal Processor (DSP), a Field Programmable Gate Array (FPGA), an Application Specific Integrated Circuit (ASIC), other programmable logic devices, transistor logic device, or a discrete hardware component. The foregoing general-purpose processor may be a microprocessor, any conventional processor or the like.

The foregoing memory may be a volatile memory or a non-volatile memory, or may include both volatile and non-volatile memories. The non-volatile memory may be a Read-Only Memory (ROM), a Programmable ROM (PROM), an erasable PROM (EPROM), an electrically EPROM (EEPROM) or a flash memory. The volatile memory may be a Random Access Memory (RAM).

It should be understood that the foregoing description of the memory is exemplary rather than limiting. For example, the memory in embodiments of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ES-DRAM), a Synch-Link DRAM (SLDRAM), a Direct Rambus RAM (DR RAM), among others. That is to say, the memory in embodiments of the present disclosure is intended to include but is not limited to those and any other suitable types of memories.

In the above embodiments, all or part of the functions described in embodiments of the disclosure may be realized through software, hardware or any combination thereof. When implemented with the software, embodiments may be implemented completely or partially in form of computer program product. The computer program product includes one or more computer instructions. When the computer program instructions are loaded and executed on a computer, the flows or functions according to embodiments of the present disclosure are completely or partially generated. The computer may be a universal computer, a dedicated computer, a computer network or another programmable device. The computer instructions may be stored in a computer-readable storage medium or transmitted from one computer-readable storage medium to another computer-readable storage medium. For example, the computer instructions may be transmitted from a website, computer, server or data center to another website, computer, server or data center in a wired way (for example, by using coaxial cable, optical fiber and Digital Subscriber Line (DSL)) or in a wireless way (for example, in a infrared, wireless or microwave way). The computer-readable storage medium may be any available medium accessible to the computer or a data storage device, such as a server and a data center, including one or more integrated available media. The available media may be a magnetic medium (for example, a floppy disk, a hard disk, and a magnetic tape), an optical medium (for example, a Digital Video Disc (DVD)), a semiconductor medium (for example, a Solid State Disk (SSD)) or the like.

It can be appreciated that, in various embodiments of the present disclosure, the values of the sequence numbers of the above processes does not mean the order in which they are performed. The order in which the respective processes are performed should be determined by their functions and internal logics, and should not constitute any limitation on the implementations about embodiments of the present disclosure.

A person skilled in the art may clearly understand that, for the purpose of simple and clear description, with regard to specific work processes of the foregoing described system, device, and unit, reference may be made to corresponding process in the foregoing method embodiments, and details are not described herein again.

Described above are merely specific implementations of the present disclosure, but the protection scope of the present disclosure is not limited thereto. Changes or replacements readily figured out by any person skilled in the art within the technical scope disclosed in the present disclosure shall be covered by the protection scope of the present disclosure. Therefore, the protection scope of the present disclosure shall be subject to the protection scope of the claims.

What is claimed is:

1. A method for determining a relay mode, comprising:
   receiving, by a relay device, indication information for a relay mode from a remote device; and
   determining, by the relay device in a connection establishment process, a relay mode to be used according to the indication information for the relay mode,
   wherein the receiving, by the relay device, the indication information for the relay mode from the remote device comprises:
   receiving, by the relay device, the indication information for the relay mode from the remote device through a PC5-S interface, wherein the indication information is unicast from the remote device, and the relay mode comprises at least one of a layer-3 relay mode or a layer-2 relay mode;
   wherein the indication information for the relay mode comprises at least one relay mode supported by the remote device; and
   wherein the determining, by the relay device, the relay mode to be used according to the indication information for the relay mode comprises:
   selecting, by the relay device, the relay mode to be used from the at least one relay mode supported by the remote device based on capability and/or authorization information of the relay device.

2. The method according to claim 1, wherein the receiving, by the relay device, the indication information for the relay mode from the remote device comprises:
   receiving, by the relay device, the indication information for the relay mode from the remote device when establishment of a relay connection is initiated by the remote device.

3. The method according to claim 1, further comprising:
   sending, by the relay device, failure information to the remote device, in response to the at least one relay mode supported by the remote device being not supported by the relay device.

4. The method according to claim 1, wherein the relay mode further comprises a Non-3GPP InterWorking Function (N3IWF) relay mode.

5. A terminal device, comprising: a processor and a memory, wherein the memory is configured to store a computer program, and the processor is configured to call and run the computer program stored in the memory, to perform a method for determining a relay mode, comprising:
   receiving indication information for a relay mode from a remote device; and
   determining, in a connection establishment process, a relay mode to be used according to the indication information for the relay mode,
   wherein the receiving the indication information for the relay mode from the remote device comprises:

receiving the indication information for the relay mode from the remote device through a PC5-S interface, wherein the indication information is unicast from the remote device, and the relay mode comprises at least one of a layer-3 relay mode or a layer-2 relay mode;

wherein the indication information for the relay mode comprises at least one relay mode supported by the remote device; and wherein the determining, by the relay device, the relay mode to be used according to the indication information for the relay mode comprises:

selecting, by the relay device, the relay mode to be used from the at least one relay mode supported by the remote device based on capability and/or authorization information of the relay device.

6. The terminal device according to claim 5, wherein the receiving the indication information for the relay mode from the remote device comprises:

receiving the indication information for the relay mode from the remote device when establishment of a relay connection is initiated by the remote device.

7. The terminal device according to claim 5, wherein the relay mode further comprises a Non-3GPP InterWorking Function (N3IWF) relay mode.

8. A network device, comprising: a processor and a memory, wherein the memory is configured to store a computer program, and the processor is configured to call and run the computer program stored in the memory, to perform a method for receiving a relay mode, comprising:

sending indication information for a relay mode to a relay device through a PC5-S interface, wherein the indication information is unicast from the network device, and the relay mode comprises at least one of a layer-3 relay mode or a layer-2 relay mode; and receiving, in a connection establishment process, a relay mode to be used, wherein the relay mode to be used is determined by the relay device in the connection establishment process according to the indication information for the relay mode;

wherein the indication information for the relay mode comprises at least one relay mode supported by the remote device; and wherein the relay mode to be used is selected by the relay device from the at least one relay mode supported by the remote device based on capability and/or authorization information of the relay device.

9. The network device according to claim 8, wherein the sending the indication information for the relay mode to the relay device comprises:

sending the indication information for the relay mode to the relay device when initiating establishment of a relay connection.

10. The network device according to claim 8, wherein the relay mode further comprises a N3IWF relay mode.

* * * * *